United States Patent
Sudo et al.

(10) Patent No.: US 8,069,323 B2
(45) Date of Patent: Nov. 29, 2011

(54) STORAGE SYSTEM AND REMOTE COPY CONTROL METHOD

(75) Inventors: Azusa Sudo, Kawasaki (JP); Kenta Shiga, Yokohama (JP); Toshihiko Murakami, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 394 days.

(21) Appl. No.: 12/314,275

(22) Filed: Dec. 8, 2008

(65) Prior Publication Data

US 2010/0100695 A1   Apr. 22, 2010

(30) Foreign Application Priority Data

Oct. 16, 2008   (JP) .................................. 2008-267051

(51) Int. Cl.
  *G06F 12/00*   (2006.01)
  *G06F 12/16*   (2006.01)
(52) U.S. Cl. .......... 711/162; 711/E12.001; 711/E12.103
(58) Field of Classification Search .................. 711/162, 711/E12.001, E12.103
  See application file for complete search history.

(56) References Cited

U.S. PATENT DOCUMENTS

2004/0103254 A1   5/2004  Satoyama et al.
2007/0038748 A1*  2/2007  Masuyama ................... 709/225

FOREIGN PATENT DOCUMENTS

JP    2004-145855    6/2006

* cited by examiner

*Primary Examiner* — Jasmine Song
(74) *Attorney, Agent, or Firm* — Stites & Harbison PLLC; Juan Carlos A. Marquez, Esq.

(57) ABSTRACT

A storage system is provided which is capable of realizing a remote copy function for speeding up lines virtually by satisfying such demand to distribute copy data into a plurality of lines. In a storage system for connecting a local storage device and a remote storage device via a plurality of lines, the local storage device includes a remote copy program for distributing data of a plurality of logical volumes accessed from a host computer into a plurality of paths on the basis of status of the plurality of paths interposing the plurality of lines, to perform a remote copy from the local storage device to the remote storage device. Accordingly, the local storage device distributes data of the logical volumes into the plurality of lines to copy the data to the remote storage device, resulting in speeding up the lines virtually.

13 Claims, 11 Drawing Sheets

IP ADDRESS TABLE OF LOCAL STORAGE DEVICE

IP ADDRESS TABLE OF REMOTE STORAGE DEVICE

FIG. 7

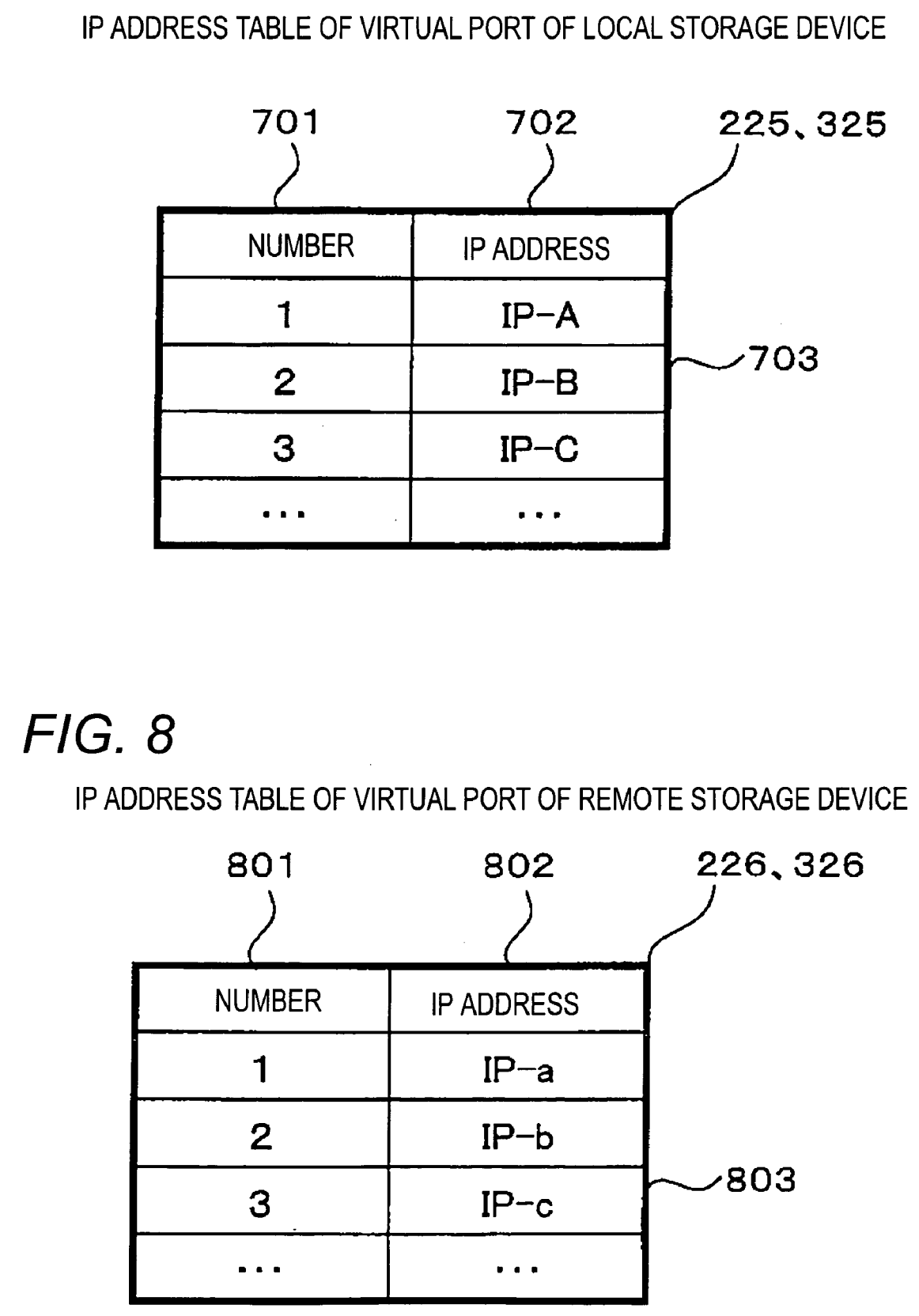

IP ADDRESS TABLE OF VIRTUAL PORT OF LOCAL STORAGE DEVICE 225, 325

| NUMBER (701) | IP ADDRESS (702) |
|---|---|
| 1 | IP-A |
| 2 | IP-B |
| 3 | IP-C |
| ... | ... |

IP ADDRESS TABLE OF VIRTUAL PORT OF REMOTE STORAGE DEVICE 226, 326

| NUMBER (801) | IP ADDRESS (802) |
|---|---|
| 1 | IP-a |
| 2 | IP-b |
| 3 | IP-c |
| ... | ... |

PATH MANAGEMENT TABLE

| PATH NUMBER | LOCAL IP | REMOTE IP | PATH STATUS |
|---|---|---|---|
| 1 | IP-A | IP-a | NORMAL |
| 2 | IP-B | IP-b | NORMAL |
| 3 | IP-C | IP-c | BLOCKAGE |
| ... | ... | ... | ... |

# STORAGE SYSTEM AND REMOTE COPY CONTROL METHOD

CROSS REFERENCES TO RELATED APPLICATIONS

This application relates to and claims priority from Japanese Patent Application No. 2008-267051, filed on Oct. 16, 2008, the entire disclosure of which is incorporated herein by reference.

BACKGROUND OF THE INVENTION

1. Field of the Invention

The present invention relates to a technique of creating a backup of data, and more in particular, to an efficient technique applied to a storage system for performing a remote copy by interposing a plurality of lines.

2. Description of the Background Art

As an IT (Information Technology) is introduced into conducting business in an enterprise, important business data are stored in storage devices. In preparation of a large scale of damages such as an earthquake and so on, the enterprise considers a countermeasure such as reserving backups of the business data in a remote place.

However, an amount invested in the IT is limited in small and medium enterprise and thus a remote backup is required to be realized at a low cost. Such request may become satisfactory by using low-cost lines, for example, for a line for connecting a plurality of bases.

However, since, for example, an ADSL which is a low-cost line and is generally used has a low data rate in an upload speed which is important upon transmitting data, when copy data amount increases, a manager is required to lease a higher data rate line. The higher data rate line is expensive, and thus a remote copy function capable of using a plurality of cheap and low-speed lines is demanded.

Therefore, in order to satisfy such demand, data are required to be distributed into a plurality of lines such that a plurality of low-speed lines are bonded for virtual speed-up. For example, Japanese Unexamined Patent Application Publication No. 2004-145855 discloses a method that the remote copy function distributes loads into a plurality of ports.

SUMMARY OF THE INVENTION

However, although the prior art disclosed in Patent Document 1 teaches a remote copy function distributes loads into a plurality of ports, it does not teach a plurality of liens to bond bases and a method of distributing loads into a plurality of lines.

The present invention is directed to provide a storage system capable of realizing a remote copy function for speeding up lines virtually by satisfying such demand to distribute copy data into a plurality of lines.

The foregoing and other objects, features, aspects and advantages of the present invention will become more apparent from the following detailed description when read in conjunction with the accompanying drawings.

Representative invention disclosed in this document is summarized as follows.

In other words, in a storage system for connecting a first storage device (a local storage device) and a second storage device (remote storage device) via a plurality of lines, the first storage device includes a remote copy program for distributing data of a plurality of logical volumes accessed from a host computer into a plurality of paths on the basis of status of the plurality of paths interposing the plurality of lines, to perform a remote copy from the first storage device to the second storage device. Thereby, the first storage device distributes data of the logical volumes into the plurality of lines to copy the data to the second storage device, resulting in speeding up the lines virtually.

Representative effect obtained from the representative intention is described in brief as follows.

In other words, an effect is obtained that a remote copy function is realized, the remote copy function performing a copy by distributing data into a plurality of cheap and low-speed lines, and thereby it is possible to speed up the lines virtually, resulting in coping with increase of a copy data amount and low cost of lines.

BRIEF DESCRIPTION OF THE DRAWINGS

FIG. 7 is a diagram to illustrate a configuration of an IP address table of virtual ports of the local storage device according to the embodiment of the present invention;

FIG. 8 is a diagram to illustrate a configuration of an IP address table of virtual ports of the remote storage device according to the embodiment of the present invention;

FIG. 9 is a diagram to illustrate a configuration of a path management table according to the embodiment of the present invention;

DESCRIPTION OF PREFERRED EMBODIMENTS

Figure 1:
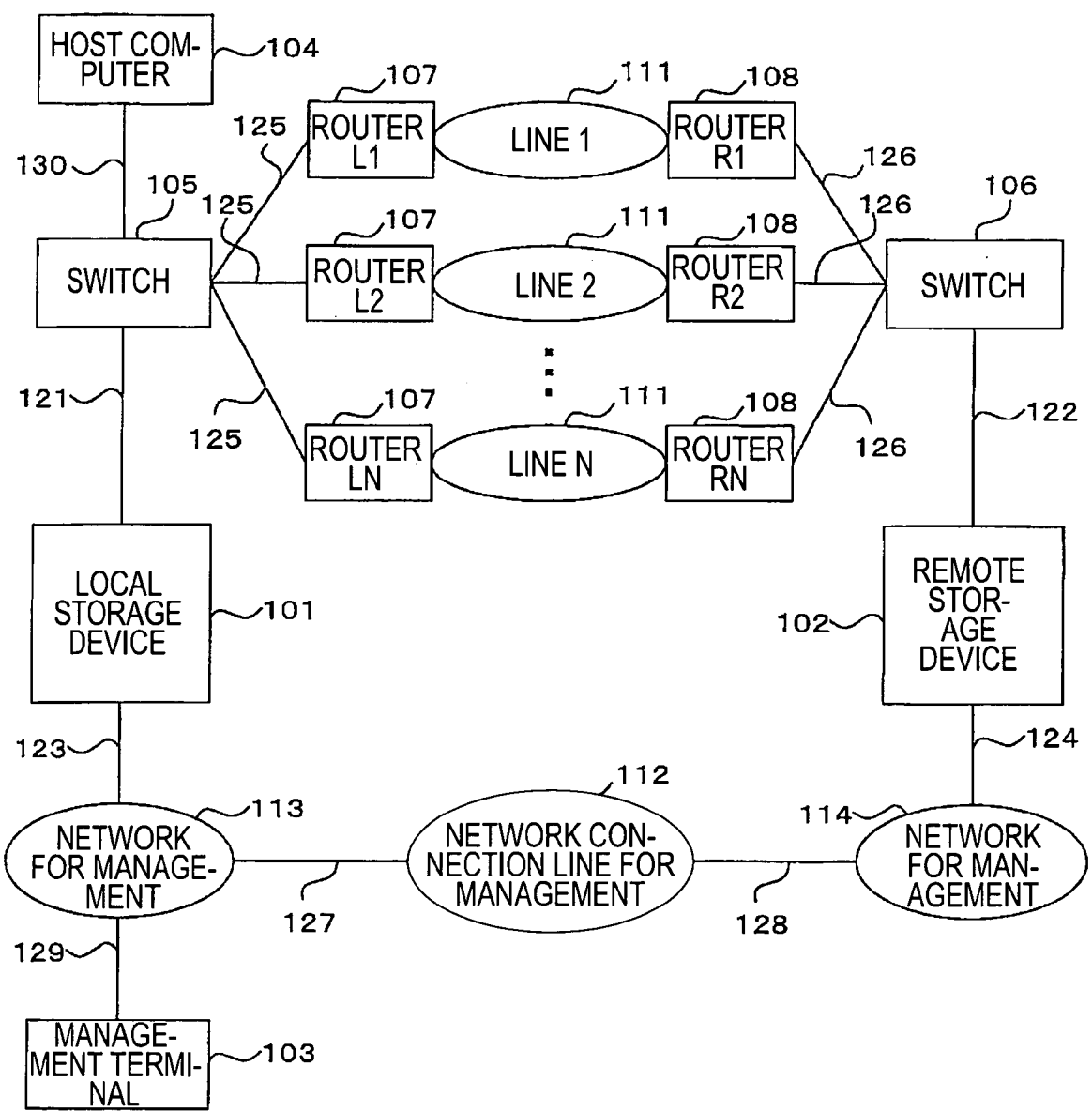
FIG. 1 is a diagram to illustrate an entire configuration of a storage system according to an embodiment of the present invention.

Hereinafter, embodiments of the present invention will be described with reference to the accompanying drawings. Like reference numerals are given to like elements in the drawings. The present invention is not limited to embodiments of the present invention; rather all the applicable examples to coincide with the scope of the present invention correspond to the present invention. Furthermore, as long as not limited particularly, each element may be singular or plural.

FIG. 1 is a diagram to illustrate an entire configuration of a storage system of an embodiment of the present invention. The storage system according to the embodiment of the present invention includes, for example, one or more local storage device 101 (one example in FIG. 1), one or more remote storage device 102 (one example in FIG. 1), a management terminal 103 (one example in FIG. 1), one or more host computer 104 (one example in FIG. 1), a plurality of switches 105 and 106 (one example in the local site and one example in the remote site in FIG. 1) and a plurality of router 107 and 108 (N examples of L1 to LN in the local site and N example of R1 to RN in the remote site in FIG. 1).

The local storage device 101 disposed in the local site and the remote storage device 102 disposed in the remote site are connected to each other, for example, via the switch 105 in the local site, the N routers 107 therein, the N lines 111, the N routers 108 in the remote site and the N switches 106 therein. The local storage device 101 and the management terminal 103 are connected to each other, for example, via a network 113 for management in the local site. The remote storage device 102 and the management terminal 103 are connected to each other, for example, via a network 114 for management in the remote site and a network connection line 112. The local storage device 101 and the host computer 104 are connected to each other, for example, via the switch 105 in the local site.

The local storage device 101 is connected to the switch 105 in the local site via a communication line 121 and then is connected to the network 113 for management via a communication line 123. The remote storage device 102 is connected to the switch 106 in the remote site via a communication line 122, and then is connected to the network 114 for management via the communication line 124. The management terminal 103 is connected to the network 113 for management in the local site via a communication line 129. The host computer 104 is connected to the switch 105 in the local site via the communication line 130.

The switch 105 in the local site is connected to the host computer 104 via a communication line 130 and then is connected to the N routers 107 in the local site via communication lines 125. The switch 106 in the remote switch is connected to the N routers 108 in the remote site via communication lines 126. The N routers 107 in the local site and the N routers 108 in the remote site are connected to each other via the N lines 111. The N lines 111 employ a low-speed line which is cheap.

The network 113 for management of the local site is connected to the network connection line 112 for management via a communication line 127. The network 114 for management of the remote site is connected to the network connection line 112 for management via a communication line 128.

The above-described communication lines 121, 122, 123, 124, 127, 128, 129 and 130 are configured of a wire such as metal cable or an optical fiber cable or the like. However, the connection between the host computer 104 and the local storage device 101 and the connection between the local storage device 101 and the management terminal 103 may be performed by wireless. In this case, the communication lines 121, 130, 123 and 129 are omitted.

Figure 2:
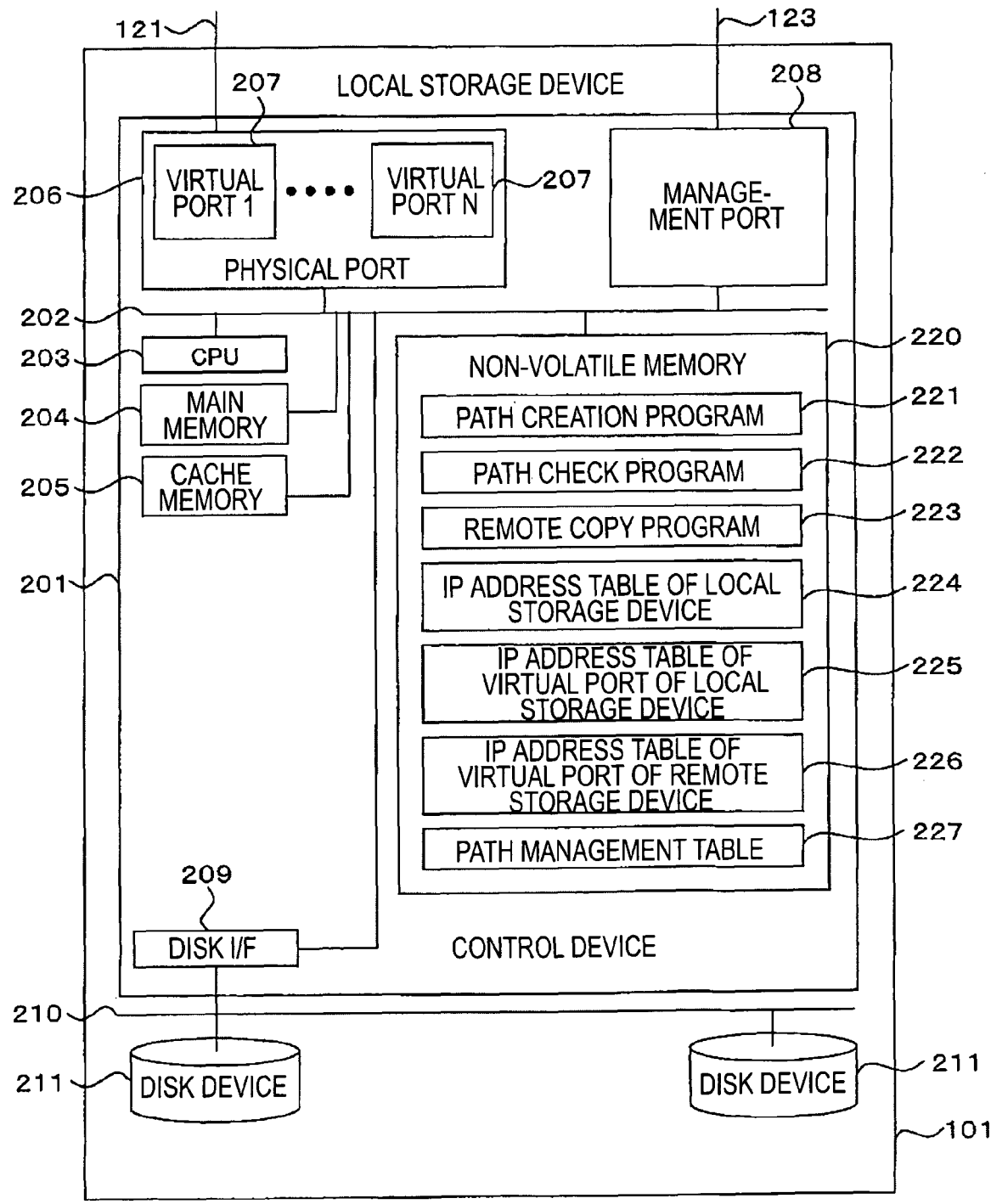
FIG. 2 is a diagram to illustrate a configuration of a local storage device according to the embodiment of the present invention.

FIG. 2 is a diagram to illustrate a configuration of the local storage device 101 according to the embodiment of the present invention. The local storage device 101 is a memory device system having one or more memory devices, which is largely classified into a control device 201 and disk devices 211. In the embodiment of the present invention, one or more logical volumes which are accessed from the host computer 104 are set in the disk devices 211. Although a hard disk device is used as the disk device 211 as an example, other memory devices such as a flash memory device and the like may be used. The disk devices 211 are connected to the control device 201 via a communication line 210 such as a fiber channel cable or the like. In addition, an RAID (Redundant Array of Independent Disks) configuration can be obtained from a plurality of disk devices 211.

A configuration of the control device 201 will now be described. The control device 201 controls writing and reading data into and from the disk devices 211 depending on a command received from the host computer 104. Access from the host computer 104 is performed for data of one or more logical volumes set in the disk devices 211.

The control unit 201 is configured to include, for example, a non-volatile memory 220, a CPU (Central Processing Unit) 203, a main memory 204, a cache memory 205, a physical port 206, a management port 208 and a disk interface (the interface is indicated by an abbreviation of I/F in the figure) 209. Such memories 220, 204 and 205, the CPU 203, the physical port 206, the management port 208, and the disk I/F 209 are mutually connected via a communication line 202 such as a bus and the like.

In addition, the embodiment of the present invention premises that a plurality of IP addresses can be set in the physical port 206 of the local storage device 101. As above, virtual ports in which a plurality of IP addresses are set are commonly referred to as virtual ports 207. For example, when a manager set IP-A, IP-B, IP-C, . . . in the physical port 206, each thereof becomes virtual ports 207-1, 2, 3, . . . . In this case, an IP address of the physical port 206 and IP addresses of the virtual ports 207 may be identical or different.

As the non-volatile memory 220, there are a rewritable non-volatile memory such as a flash memory and the like. In such non-volatile memory 220, for example, a path creation program 221, a path check program 222, a remote copy program 223, an IP address table of local storage device 224, an IP address table of virtual port of local storage device 225, an IP address table of virtual port of remote storage device 226 and a path management table 227 can be memorized.

Each of the programs 221, 222 and 223 is transmitted to the main memory 204 from the non-volatile memory 220 and then is run by the CPU 203.

The path creation program 221 is a program for the CPU 203 creating one or more paths between the local storage device 101 and the remote storage device 102.

The path check program 222 is a program for the CPU 203 checking one or more path status periodically (for example, at an interval of 60 seconds).

The remote copy program 223 is a program for the CPU 203 distributing data into one or more paths to perform a remote copy from the local storage device 101 to the remote storage device 102.

The IP address table of local storage device 224 records IP addresses and default gateways of the physical port 206 and the virtual ports 207 of the local storage device 101. Detailed description thereof will be made later with reference to FIG. 5.

The IP address table of virtual port of local storage device 225 records IP addresses of the virtual ports 207 of the local storage device 101. Detailed description thereof will be made later with reference to FIG. 7.

The IP address table of virtual port of remote storage device 226 records IP addresses of virtual ports 307 of the remote storage device 102. Detailed description thereof will be made later with reference of FIG. 8.

The path management table 227 records a path number, an IP address of virtual port of local storage device, an IP address of virtual port of remote storage device and a path status, between the local storage device 101 and the remote storage device 102. Detailed description thereof will be made later with reference to FIG. 9.

Each of the programs 221, 222 and 223 memorized in the non-volatile memory 220 are transmitted to the main memory 204, if necessary. The CPU 203 executes the respective programs 221, 222 and 223 and thereby a path creation processing, a path check processing and a copy data distribution processing are performed, respectively.

The cache memory 205 records data received from the host computer 104 and data read out from the disk devices 211.

The physical port 206 is connected to the host computer 104 via the communication line 121 or the switch 105.

The virtual ports 207 represent virtual ports created in a case where a plurality of IP addresses can be set in the physical port 206. An IP address of the physical port 206 may be the same as any one of the virtual ports or different therefrom.

The management port 208 is connected to the management terminal 103 via the communication line 123 or the network 113 for management.

The disk I/F 209 transmits and receives data between the respective disk devices 211. The disk I/F 209 is connected to the respective disk devices 211 via the communication line 210.

A fundamental operation of the local storage device 101 will be described in brief. The operation of the local storage device 101 is initialized by a write command or a read command, which is received from the host computer 104, for data of one or more logical volumes set in the disk devices 211.

When receiving a write command from the host computer 104, the control device 201 stores a write data received from the host computer 104 into the cache memory 205. The control device 201 writes the write data stored in the cache memory 205 into the disk device 211 via the disk I/F 209.

In addition, the control device 201 may report the completion of processing for the write command to the host computer 104 at the time of storing the write data into the cache memory 205, or it may report the completion of processing for the write command to the host computer 104 at the time of writing the write data into the disk device 211.

When receiving a read command from the host computer 104, the control device 201 checks whether or not data requested by the host computer 104 is stored in the cache memory 205. If the data requested by the host computer 104 is stored in the cache memory 205, the control device 201 reads out the data from the cache memory 205 to be transmitted to the host computer 104 via the physical port 206.

If the data requested by the host computer 104 is not stored in the cache memory 205, the control device 201 reads out the data from the disk devices 211 via the disk I/F 209 to be transmitted to the cache memory 205. The control device 201 transmits the data stored in the cache memory 205 to the host computer 104 via the physical port 206.

Figure 3:
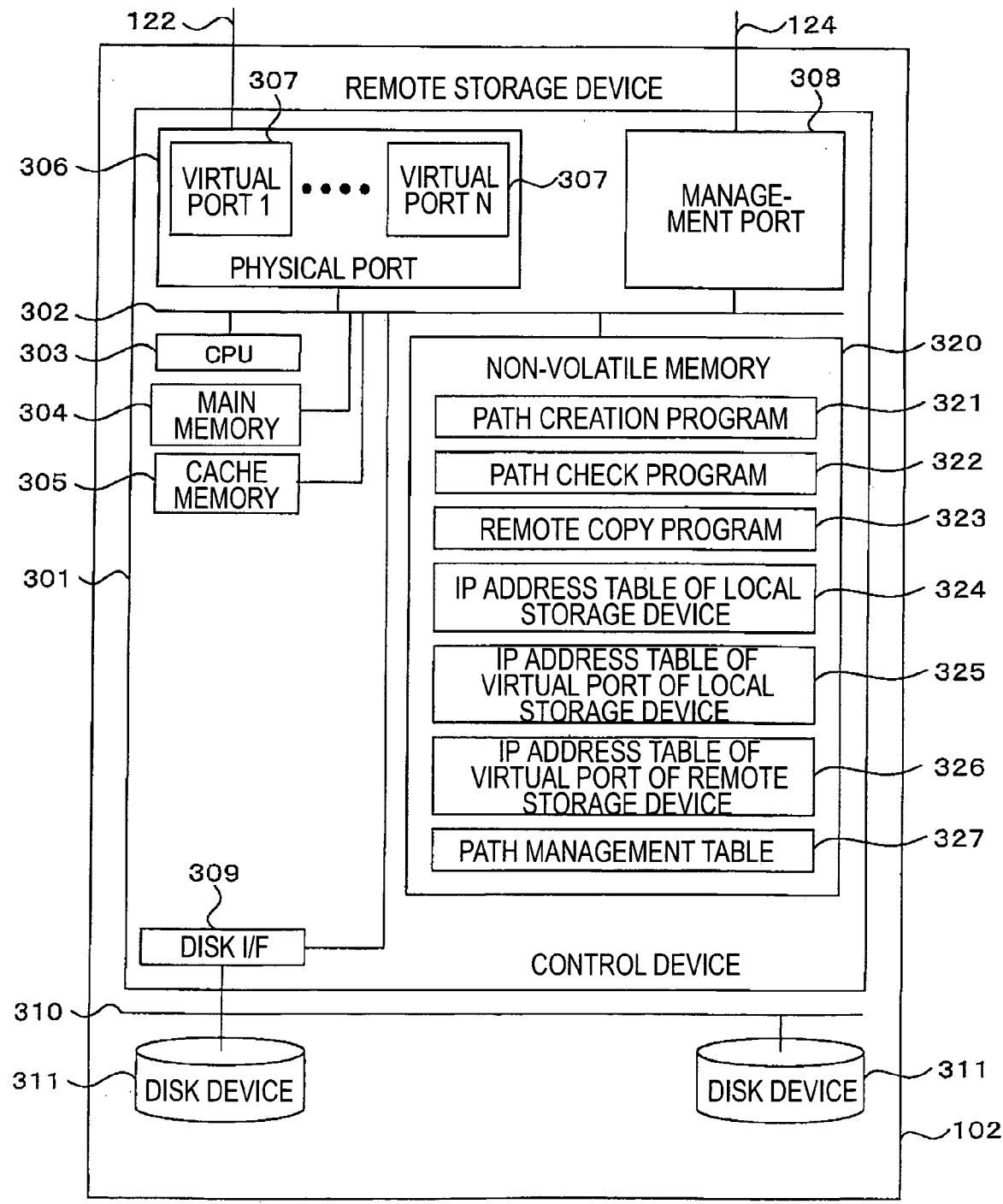
FIG. 3 is a diagram to illustrate a configuration of a remote storage device according to the embodiment of the present invention.

FIG. 3 is a diagram to illustrate a configuration of the remote storage device 102 according to the embodiment of the present invention. The remote storage device 102 is a memory device system having one or more memory devices like the local storage device 101 and can be largely classified into a control device 301 and a disk device 311.

The configuration of the control device 301 will now be described. The control device 301 controls writing and reading data into and from the disk devices 311 depending on a command received from the host computer 104. The control device 301, like the local storage device 101, is configured to include, for example, a non-volatile memory 320, a CPU (Central Processing Unit) 303, a main memory 304, a cache memory 305, a physical port 306, a management port 308 and a disk I/F 309. Such memories 320, 304 and 305, the CPU 303, the physical port 306, the management port 308, and the disk I/F 309 are mutually connected via a communication line 302 such as a bus and the like.

Hereinafter, only parts different from the local storage device 101 will be described.

In the non-volatile memory 320, for example, a path creation program 321, a path check program 322, a remote copy program 323, an IP address table of remote storage device 324, an IP address table of virtual port of remote storage device 325, an IP address table of virtual port of remote storage device 326 and a path management table 327 can be memorized.

The programs 321, 322 and 323 and the tables 325, 326 and 327 have the same structures as the local storage device 101 and thus the description thereof will be omitted.

The IP address table of remote storage device 324 records IP addresses and default gateways of the physical port 306 and the virtual ports 307 of the remote storage device 102. Detailed description thereof will be made later with reference to FIG. 6.

When a remote copy is performed from the local storage device 101 to the remote storage device 102, the path creation program 321, the path check program 322, the remote copy program 323, the IP address table of remote storage device 324, and the path management table 327 are memorized into the remote storage device 102 to cope with the remote copy. Reversely, when a remote copy is performed from the remote storage device 102 to the local storage device 101, the IP address table of virtual port of local storage device 325 and the IP address table of virtual port of remote storage device 326 are necessary in the remote storage device 102, and thus the configuration including such tables in this embodiment is shown in the figure.

A fundamental operation of the remote storage device 102 will be described in brief.

When receiving a write command from the local storage device 101, the control device 301 stores the write command received from the local storage device 101 into the cache memory 305. The control device 301 writes a write data stored in the cache memory 305 into the disk device 311 via the disk I/F 309. In addition, the control device 301 may report the completion of processing for the write command to the local storage device 101 at the time of storing the write data into the cache memory 305, or it may report the completion of processing for the write command to the local storage device 101 at the time of writing the write data into the disk device 311.

When receiving a read command from the local storage device 101, the control device 301 checks whether or not data requested by the local storage device 101 is stored in the cache memory 305. If the data requested by the local storage device 101 is stored in the cache memory 305, the control device 301 reads out the data from the cache memory 305 to be transmitted to the local storage device 101 via the physical port 306.

If the data requested by the local storage device 101 is not stored in the cache memory 305, the control device 301 reads out the data from the disk devices 311 via the disk I/F 309 to be transmitted to the cache memory 305. The control device 301 transmits the data stored in the cache memory 305 to the local storage-device 101 via the physical port 306.

Figure 4:
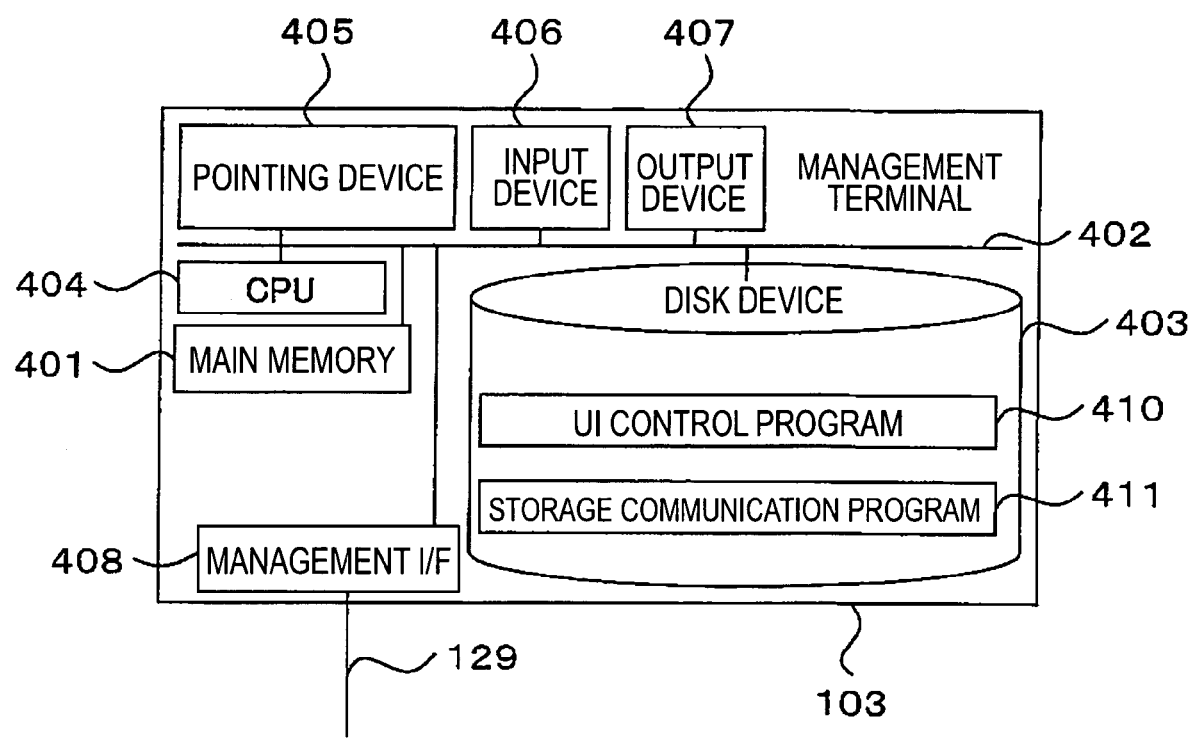
FIG. 4 is a diagram to illustrate a configuration of a management terminal according to the embodiment of the present invention.

FIG. 4 is a diagram to illustrate a configuration of the management terminal 103 according to the embodiment of the present invention. The management terminal 103 is configured to include, for example, a main memory 401, a bus 402, a disk device 403, a CPU 404, a pointing device 405, an input device 406, an output device 407 and a management I/F 408. The main memory 401, the disk device 403, the CPU 203 404 and the management I/F 408 are mutually connected via the bus 402.

A UI control program 410 and a storage communication program 411 stored in the disk device 403 are transmitted to the main memory 401, if necessary. The CPU 404 executes the respective programs 410 and 411 read in the main memory 401 to perform a UI control processing and a storage communication processing.

The disk device 403 can record, for example, the UI control program 410 and the storage communication program 411.

The UI control program 410 is a program for the CPU 404 displaying a screen such as a path creation screen 1001 (described later in FIG. 10), a path status display screen 1101 (described later in FIG. 11) and the like on the output device 407. The UI control program 410 enables the CPU 404 to transmit information inputted by a manager via the pointing device 405 or the input device 406, to the storage communication program 411.

The storage communication program 411 is a program for the CPU 404 communicating with the local storage device 101 via the network 113 for management.

The configuration of the host computer 104 is the same as that of a conventional host computer.

Figure 5:
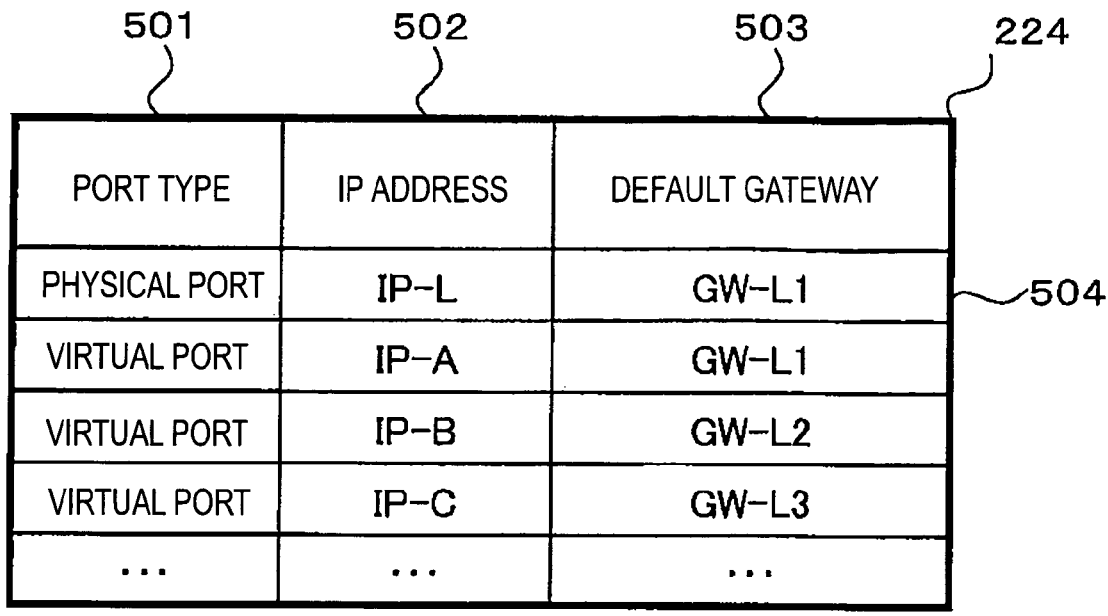
FIG. 5 is a diagram to illustrate a configuration of an IP address table of the local storage device according to the embodiment of the present invention.

FIG. 5 is a diagram to illustrate a configuration of the IP address table of local storage device 224 according to the embodiment of the present invention. The IP address table of local storage device 224 manages, for example, "port type" column 501, "IP address" column 502 and "default gateway" column 503 in the manner of associating with one another.

Kinds of ports (in detail, whether the physical port or the virtual port) of IP addresses set in the local storage device 101 are stored in the "port type" column 501. IP addresses set in the physical port 206 and the virtual ports 207 of the local storage device 101 are stored in the "IP address" column 502. Default gateways set in the physical port 206 and the virtual ports 207 of the local storage device 101 are stored in the "default gateway" column 503. For instance, the second row 504 in FIG. 5 represents that an IP address of the virtual port 207 of the local storage device 101 is "IP-A" and the default gateway is "GW-L1."

In this embodiment, it is assumed that a manager registers IP addresses of the routers 107 which traverse different lines for the respective virtual ports, as the default gateways of the virtual ports 207.

Figure 6:
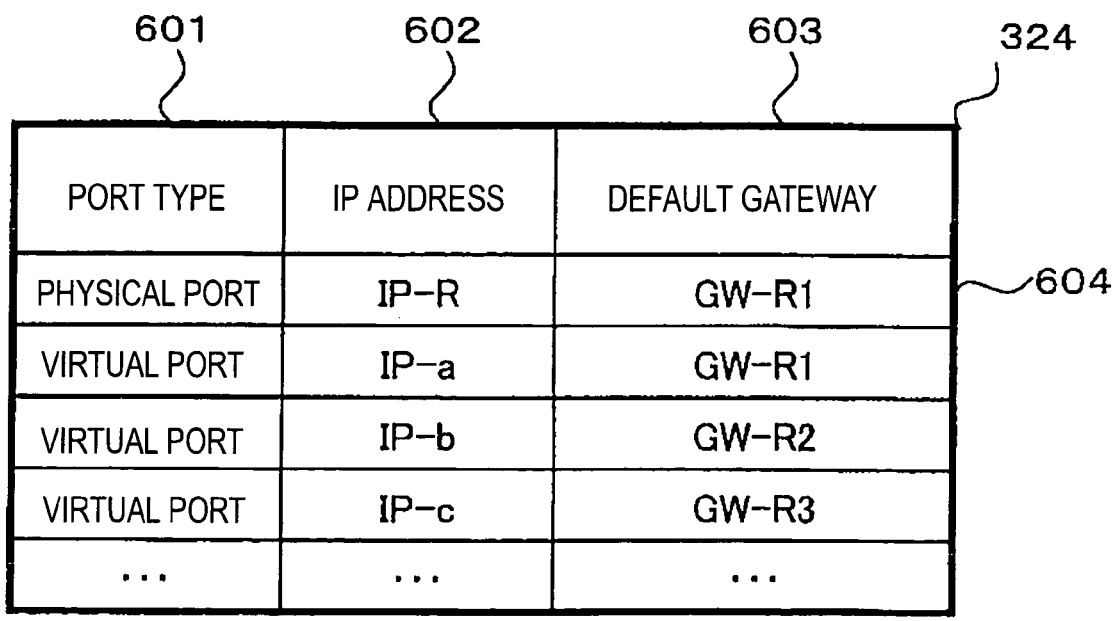
FIG. 6 is a diagram to illustrate a configuration of an IP address table of the remote storage device according to the embodiment of the present invention.

FIG. 6 is a diagram to illustrate a configuration of the IP address table of remote storage device 324 according to the embodiment of the present invention. The IP address table of remote storage device 324 manages "port type" column 601, "IP address" column 602 and "default gateway" column 603 in the manner of associating with one another.

Contents stored in the "port type" column 601, the "IP address" column 602 and the "default gateway" column 603 are the same as those stored in the IP address table of local storage device 224.

For example, the second row 604 in FIG. 6 represents that an IP address of the virtual port 307 of the remote storage device 102 is "IP-a" and the default gateway is "GW-R1."

In this embodiment, it is assumed that a manager registers IP addresses of the routers 108 which traverse different lines for the respective virtual ports, as the default gateways of the virtual ports 307.

FIG. 7 is a diagram to illustrate a configuration of the IP address table of virtual port of local storage device 225 and 325. The IP address table of virtual port of local storage device 225 and 325 manages the "number" column 701 and the "IP address" column 702 in the manner of associating with each other.

In the "number" column 701, when one row is added, a numeral of adding 1 to a previous number is stored. In this embodiment, the first row is assumed to be "1."

IP addresses of the virtual ports 207 of the local storage device 101 are stored in the "IP address" column 702.

For example, the second row 703 in FIG. 7 represents that an IP address of the virtual port 207 of the local storage device 101 which is added "secondly" is "IP-B."

The CPU 203 of the local storage device 101 creates a path to read out the IP address of the virtual port 207 from the "IP address" column 502 of the IP address table of local storage device 224 for addition to the IP address table of virtual port of local storage device 225 and 325.

FIG. 8 is a diagram to illustrate a configuration of the IP address table of virtual port of local storage device 226 and 326. The IP address table of virtual port of remote storage device 226 and 326 manages the "number" column 801 and the "IP address" column 802 in the manner of associating with each other.

In the "number" column 801, when one row is added, a numeral of adding 1 to a previous number is stored. In this embodiment, the first row is assumed to be "1."

IP addresses of the virtual ports 307 of the remote storage device 102 are stored in the "IP address" column 802.

For example, the third row 803 in FIG. 8 represents that an IP address of the virtual port 307 of the remote storage device 102 which is added "thirdly" is "IP-c."

According to the path creation program 221 by the CPU 203 of the local storage device 101, the IP address of the virtual port 307 of the remote storage device 102 is added to the IP address table of virtual port of remote storage device 226 and 326.

FIG. 9 is a diagram to illustrate a configuration of the path management table 227 and 327 according to the embodiment of the present invention. The path management table 227 and 327 manages, for example, the "path number" column 901, the "local IP" column 902, the "remote IP" column 903 and the "path status" column 904 in the manner of associating with one another.

In the "path number" column 901, when one row is added, a numeral of adding 1 to a previous number is stored. An IP address of the local storage device 101 sided virtual port 207 of a created path is stored in the "local IP" column 902. An IP address of the remote storage device 102 sided virtual port 307 of the created path is stored in the "remote IP" column 903. In the "path status" column 904, a status of the path such as normal or blockage is stored.

For example, the second row 905 in FIG. 9 represents that the local storage device 101 sided IP address of the secondly added path is "IP-B," the remote storage device 102 sided IP address is "IP-b," and a status of the path is "normal."

In this embodiment, the "local IP" column 902 and the "remote IP" column 903 are added according to the path creation program 221 by the CPU 203 of the local storage device 101 and a status of the path is updated due to a path check processing by the CPU 203 of the local storage device 101.

The local storage device 101 and the management terminal 103 may receive an IP address of the physical port 306 of the remote storage device 102 and an iSCSI Target port number from a manager, create paths on the basis of the information, check status of the paths periodically and display the status of the paths. Furthermore, the local storage device 101 performs remote copy by sorting copy data for one or plural path(s) having normal path status by use of the above-described programs and tables.

Hereinafter, processings of the local storage device 101 creating a path and checking a path status and processings of the local storage device 101 and the management terminal 103 for displaying the path status on the output device 407 will be explained with reference to FIGS. 10, 11, 12 and 13. In addition, a processing of the local storage device 101 sorting copy data into one or more normal paths to perform a remote copy will be described with reference to FIG. 14.

Figure 10:
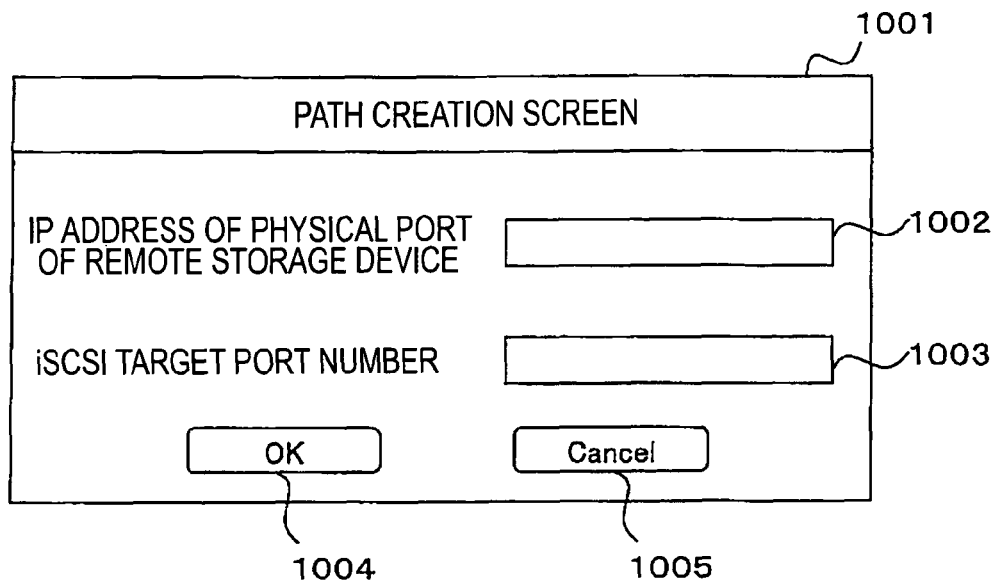
FIG. 10 is a diagram to illustrate a screen for creating paths according to the embodiment of the present invention.

FIG. 10 is a diagram to illustrate a path creation screen 1001 according to the embodiment of the present invention. The path creation screen 1001 may be provided with, for example, input portions 1002 and 1003 and buttons 1004 and 1005.

The input portion 1002 enables a manager to input an IP address of the physical port 306 of the remote storage device 102. The input portion 1003 enables a manager to input an iSCSI Target port number. The button 1004 enables a manager to decide the information inputted to the path creation screen 1001. The button 1005 enables a manager to cancel the information inputted to the path creation screen 1001.

The CPU 404 of the management terminal 103 transmits an IP address of the physical port 306 of the remote storage device 102 and an iSCSI Target port number inputted by the manager to the local storage device 101 according to the storage communication program 411. The CPU 203 of the local storage device 101 receives the IP address of the physical port 306 of the remote storage device 102 and the iSCSI Target port number.

Figure 11:
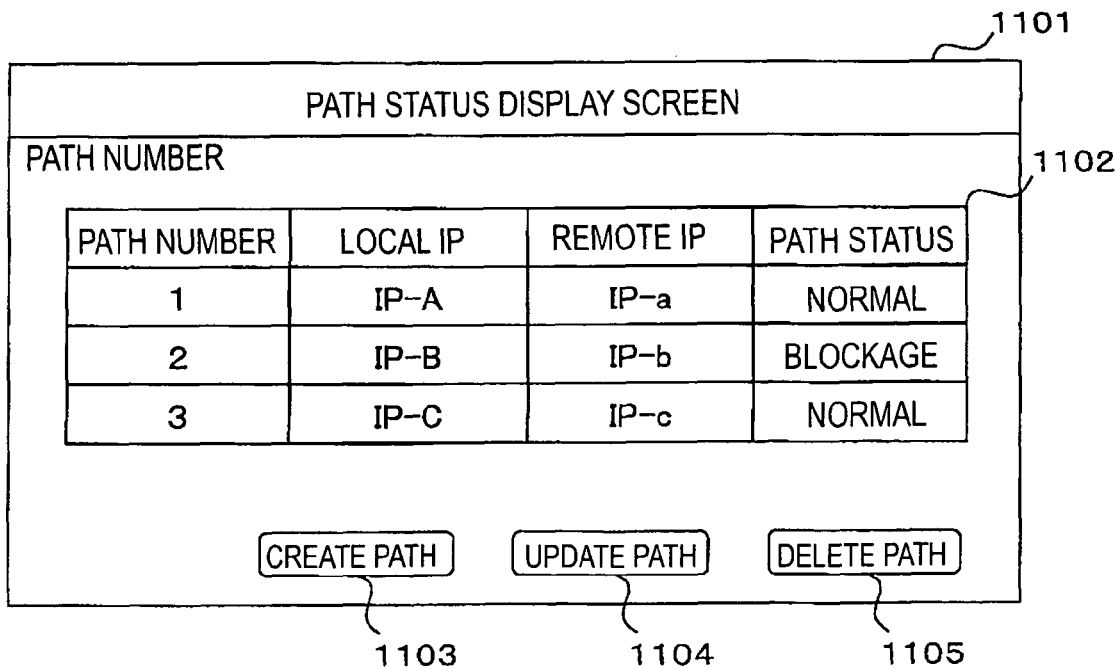
FIG. 11 is a diagram to illustrate a screen for displaying path status according to the embodiment of the present invention.

FIG. 11 is a diagram to illustrate a path status display screen 1101 according to the embodiment of the present invention. The path status display screen 1101 may be provided with, for example, display units 1102 and buttons 1103, 1104 and 1105.

The display unit 1102 displays a created path status. The button 1103 enables the path creation screen 1001 to be displayed. The button 1104 enables the path creation program 221 by the CPU 203 of the local storage device 101 to be run when a path is changed (in detail, for example, when a path is added or an IP address of a virtual port is changed). The button 1105 enables a designated path to be deleted.

The CPU 203 of the local storage device 101 transmits the path management table 227 to the management terminal 103 after the path creation processing and the path check processing are finished. The CPU 404 of the management terminal 103 receives the path management table 227 from the local storage device 101 according to the storage communication program 411 and displays the path management table 227 on the path status display screen 1101 according to the UI control program 410.

Figure 12:
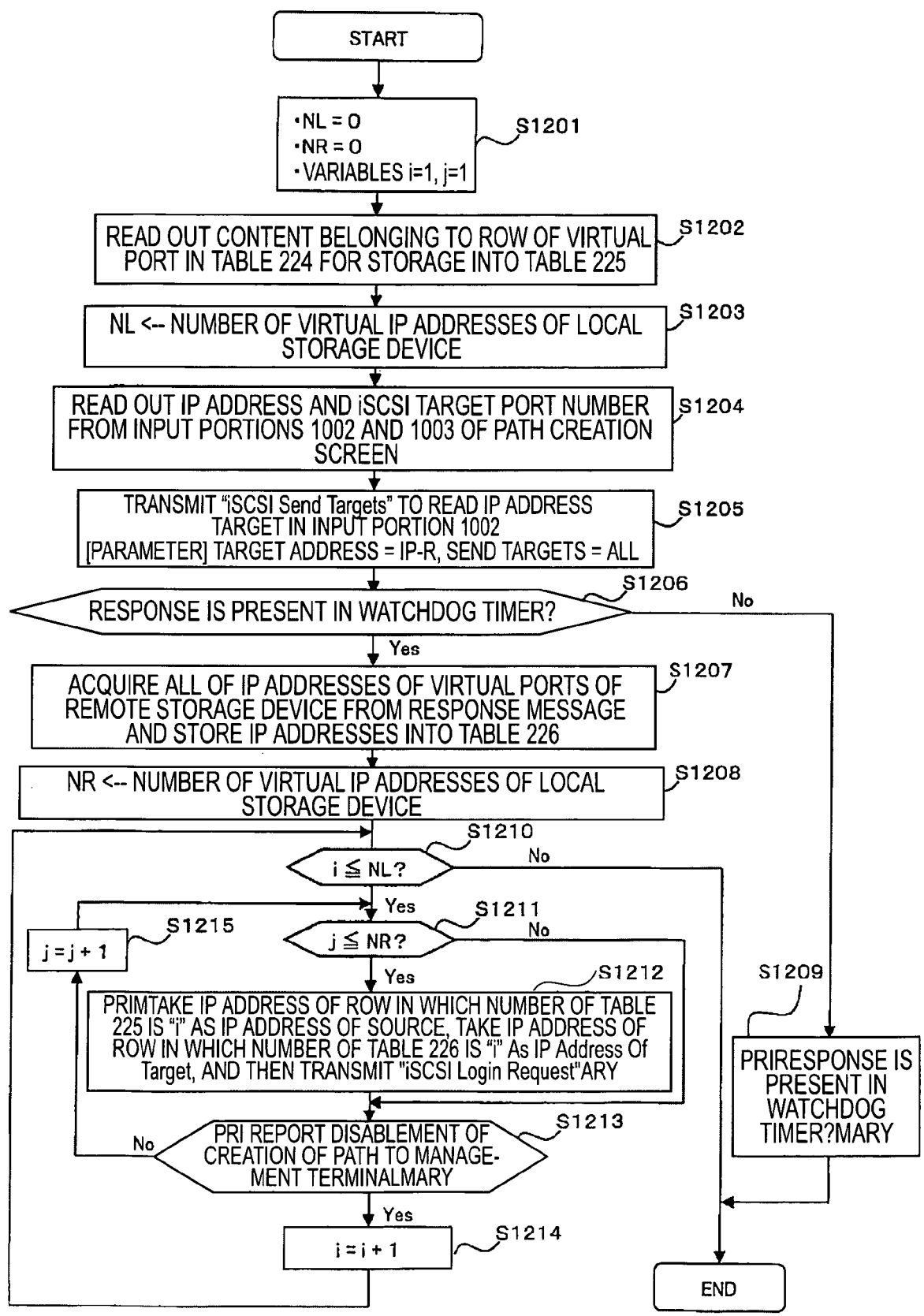
FIG. 12 is a flowchart to illustrate an order of creation a path by a path creating program according to the embodiment of the present invention.

FIG. 12 is a flowchart to illustrate an order of creating a path by the path creation program 221 according to the embodiment of the present invention, and the creation processing will be described in detail with reference to the flowchart. In the description of each flow, the step is abbreviated to "S."

When the button 1004 is operated after necessary information is inputted by use of the path creation screen 1001 displayed on the management terminal 103, the input information is transmitted to the local storage device 101 to initialize the path creation processing.

First, the CPU 203 of the local storage device 101 sets "the number of virtual IP addresses of the local storage device (hereinafter, abbreviated to NL)" to "0" as an initial value, "the number of virtual IP addresses of the remote storage device (hereinafter, abbreviated to NR)" to "0" as an initial value, and variables "i" and "j" to "1," respectively, as initial values (S1201).

The CPU 203 of the local storage device 101 reads out an IP address which belongs to a row where the "port type" (501) of the IP address table of local storage device 224 is the "virtual port" and then stores it into the IP address table of virtual port of local storage device 225 (S1202).

The CPU 203 of the local storage device 101 substitutes the number of virtual IP addresses of the local storage device 101 for the value of "NL" (S1203).

The CPU 203 of the local storage device 101 reads out an IP address of the physical port 306 of the remote storage device 102 and an iSCSI Target port number which have been inputted into the input portions 1002 and 1003 of path creation screen 1001 (S1204).

The CPU 203 of the local storage device 101 transmits "iSCSI Send Targets" to the read IP address target. In this embodiment, as parameters of such "iSCSI Send Targets," "Target Address" is taken as "an IP address (e.g., IP-R) of the physical port 306 of the remote storage device 102" and "Send Targets" is taken as "ALL" (S1205).

Subsequently, the CPU 203 of the local storage device 101 determines whether or not a response from the remote storage device 102 is present in a watchdog timer (S1206).

If there is no response from the remote storage device 102 in the watchdog timer (a result at the step S1206 is "No"), the CPU 203 of the local storage device 101 reports disablement of creation of a path to the management terminal 103 (S1209) to finish the path creation processing.

On the other hand, if there is a response from the remote storage device 102 in the watchdog timer (a result at the step S1206 is "Yes"), the CPU 203 of the local storage device 101 performs the processing of the step S1207.

In the processing of the step S1207, the CPU 203 of the local storage device 101 acquires all of the IP addresses of the virtual ports 307 of the remote storage device 102 from the response message from the remote storage device 102 and stores the IP addresses into the IP address table of virtual port of remote storage device 226.

Then, the CPU 203 of the local storage device 101 substitutes the number of virtual IP addresses of the remote storage device for a value of "NR" (S1208).

The CPU 203 of the local storage device 101 determines whether or not a value of "i" is less than a value of "NL" (S1210).

If the value of "i" is more than the value of "NL" (a result at the step S1210 is "No"), the CPU 203 of the local storage device 101 finishes the path creation processing.

In contrast, if the value of "i" is less than the value of "NL" (a result at the step S1210 is "Yes"), the CPU 203 of the local storage device 101 performs the processing of the step S1211.

In the processing of the step S1211, the CPU 203 of the local storage device 101 determines whether or not a value of "j" is less than a value of "NR."

Subsequently, the CPU 203 of the local storage device 101 performs the processing of the step S1213, if the value of "j" is more than the value of "NR" (a result at the step S1211 is "No").

In contrast, the CPU 203 of the local storage device 101 performs the processing of the step S1212, if the value of "j" is less than the value of "NR" (a result at the step S1211 is "Yes").

In the processing of the step S1212, the CPU 203 of the local storage device 101 takes an IP address of a row in which the "number" (701) of the IP address table of virtual port of local storage device 225 is "i" as an IP address of a source and takes an IP address of a row in which the "number" (801) of the IP address table of virtual port of remote storage device 226 is "j" as an IP address of a target, and then transmits "iSCSI Login" request.

The CPU 203 of the local storage device 101 determines whether or not a response from the remote storage device 102 is present in the watchdog timer (S1213).

If there is no response from the remote storage device 102 in the watchdog timer (a result at the step S1213 is "No"), the CPU 203 of the local storage device 101 performs the processing of the step S1215.

In the processing of the step S1215, the CPU 203 of the local storage device 101 adds 1 to the value of "j" to perform the processing of the step S1211.

In contrast, if there is a response from the remote storage device 102 in the watchdog timer (a result at the step S1213 is "Yes"), the CPU 203 of the local storage device 101 performs the processing of the step S1214.

In the processing of the step S1214, the CPU 203 of the local storage device 101 adds 1 to the value of "i" to perform the processing of the step S1210 again.

According to such path creation processing, if a manager has only to input an IP address of the physical port 306 of the remote storage device 102, the local storage device 101 can create a plurality of paths in the IP address target of the virtual ports 307 of the remote storage device 102.

Figure 13:
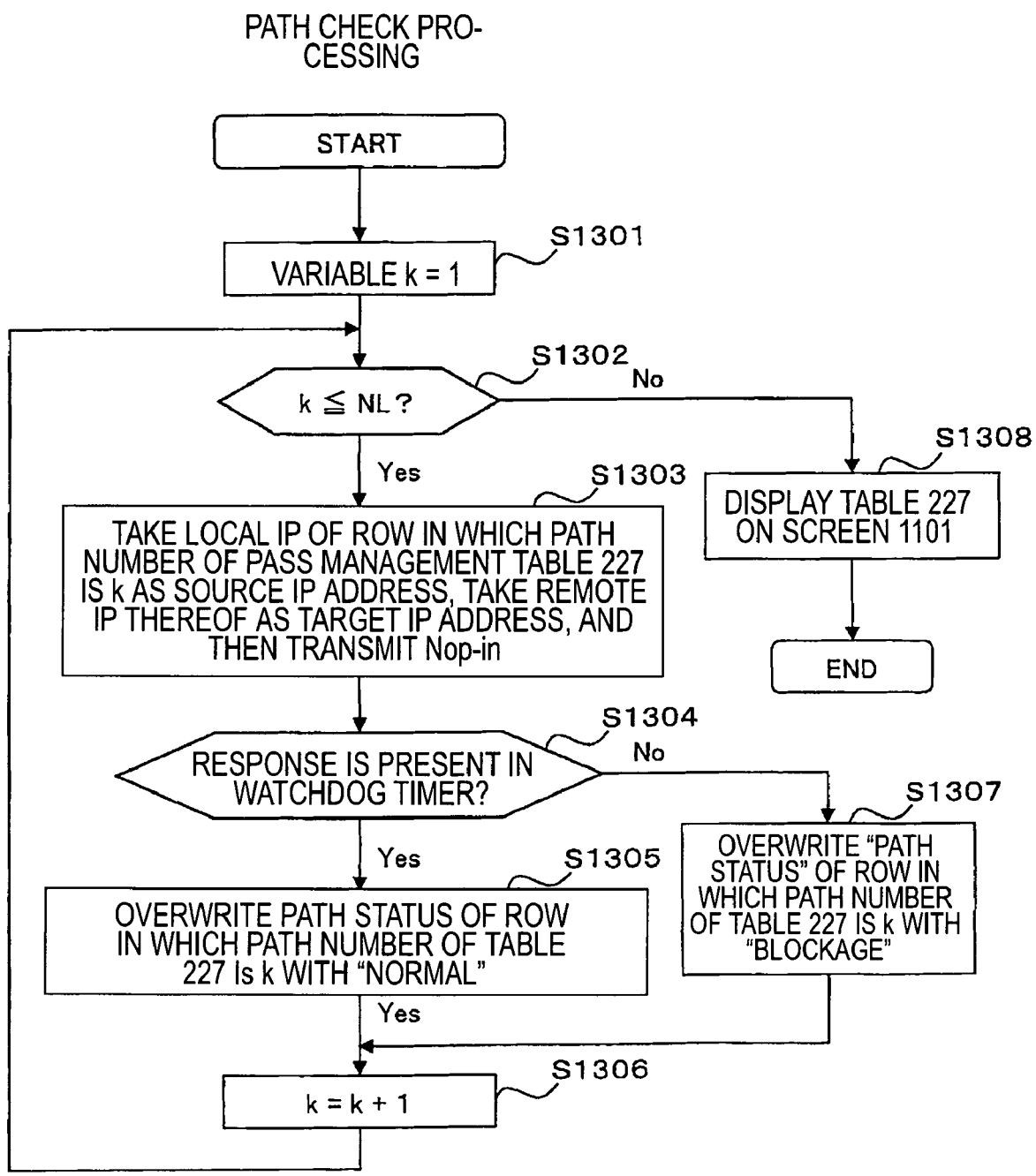
FIG. 13 is a flowchart to illustrate an order of checking a path by a path checking program according to the embodiment of the present invention.

FIG. 13 is a flowchart to illustrate an order of checking a path by the path check program 222 according to the embodiment of the present invention. This processing is performed periodically (for example, at an interval of 60 seconds).

The CPU 203 of the local storage device 101 first sets an initial value of the variable "k" to "1" (S1301).

The CPU 203 of the local storage device 101 determines whether the value of "k" is less than a value of "NL" (S1302).

If the value of "k" is more than the value of "NL" (a result at S1302 is "No"), the CPU 203 of the local storage device 101 performs the processing of the step S1308.

In the processing of the step S1308, the CPU 203 of the local storage device 101 displays the path management table 227 on the path status display screen 1101 and then finishes the path check processing.

In contrast, if the value of "k" is less than the value of "NL" (a result at the step S1302 is "Yes"), the CPU 203 of the local storage device 101 performs the processing of the step S1303.

In the processing of the step S1303, the "local IP" (902) of a row in which the "path number" (901) of the pass management table 227 is "k" as a source IP address and takes the "remote IP" (903) thereof as a target IP address, and then transmits "Nop-in."

Subsequently, the CPU 203 of the local storage device 101 determines whether or not a response from the remote storage device 102 is present in the watchdog timer (S1304). In addition, a check time of the watchdog timer is less than an interval of the path check processing being performed.

If there is no response from the remote storage device 102 in the watchdog timer (a result at the step S1304 is "No"), the processing of the step S1307 is performed.

In the processing of the step S1307, the "path status" (904) of a row in which the "path number" (901) of the path management table 227 is "k" is overwritten with "blockage" to perform the processing of the step S1306.

If there is a response from the remote storage device 102 in the watchdog timer (a result at the step S1304 is "Yes"), the CPU 203 of the local storage device 101 overwrites the "path status" (904) of a row in which the "path number" (901) of the path management table 227 is "k" with "normal" (S1305).

Subsequently, the CPU 203 of the local storage device 101 adds 1 to the value of "k" to perform the processing of the step S1302 again.

Such path check processing can check path status periodically and thereby can notify a manager of the path status.

Figure 14:
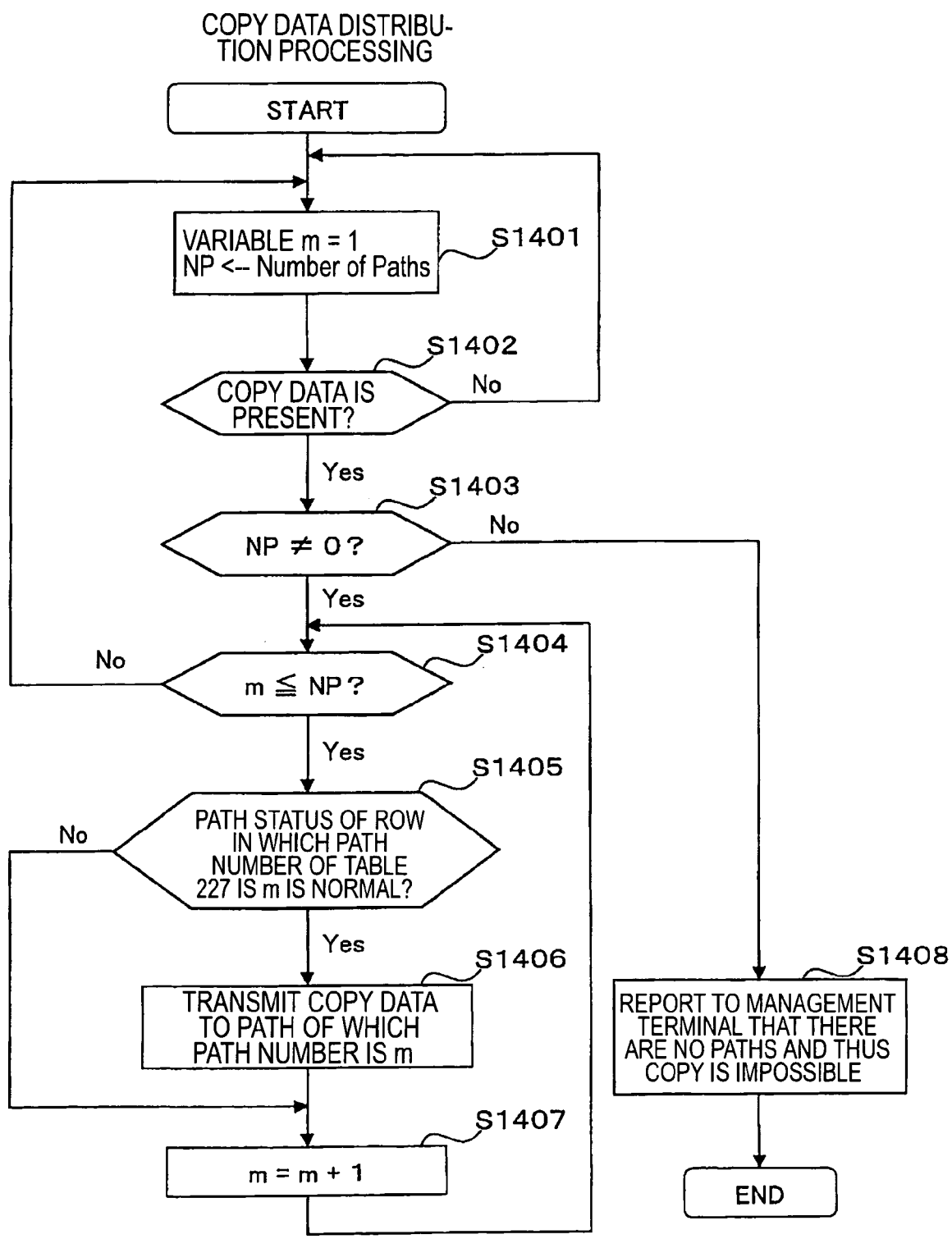
FIG. 14 is a flowchart to illustrate an order of distributing copy data by a remote copy program according to the embodiment of the present invention.

FIG. 14 is a flowchart to illustrate an order of distributing copy data by the remote copy program 223 according to the embodiment of the present invention. A unit of the copy data distributed into for each path may be a block, a packet, a command or a logical volume in the embodiment of the present invention.

The CPU 203 of the local storage device 101 sets an initial value of the variable "m" to 1 and sets the number of created paths to the number of a path (hereinafter, abbreviated to NP) (S1401).

The CPU 203 of the local storage device 101 determines whether or not copy data are present (S1402).

If the copy data are not present (a result at the step S1402 is "No"), the CPU 203 of the local storage device 101 performs the processing of the step S1401 again.

In contrast, if the copy data are present (a result at the step S1402 is "Yes"), the CPU 203 of the local storage device 101 performs the processing of the step S1403.

In the processing of the step S1403, it is determined whether or not a value of "NP" is other than "0."

If the value of "NP" is "0" (a result at the step S1403 is "No"), the processing of the step S1408 is performed.

In the processing of the step S1408, the CPU 203 of the local storage device 101 reports to the management terminal 103 that there are no paths and thus copy is impossible, to finish the copy data distribution processing.

In contrast, if the value of "NP" is other than "0" (a result at the step S1403 is "Yes"), the CPU 203 of the local storage device 101 performs the processing of the step S1404.

In the processing of the step S1404, the CPU 203 of the local storage device 101 determines whether or not a value of "m" is less than the value of "NP."

If the value of "m" is more than the value of "NP" (a result at S1404 is "NO"), the CPU 203 of the local storage device 101 again performs the processing of the step S1401.

In contrast, if the value of "m" is less than the value of "NP" (a result at the step S1404 is "Yes"), the CPU 203 of the local storage device 101 performs the processing of the step S1405.

In the processing of the step S1405, the CPU 203 of the local storage device 101 determines whether or not the "path status" (904) of a row in which the "path number" (901) of the path management table 227 is "m" is "normal."

If the "path status" (904) is not "normal" (a result at the step S1405 is "No"), the CPU 203 of the local storage device 101 performs the processing of the step S1407.

In contrast, if the "path status" (904) is "normal" (a result at the step S1405 is "Yes"), the CPU 203 of the local storage device 101 performs the processing of the step S1406.

In the processing of the step S1406, the CPU 203 of the local storage device 101 transmits the copy data to a path of which the "path number" (901) is "m."

The CPU 203 of the local storage device 101 adds "1" to the value of "m" (S1407) to perform the processing of the step S1404 again.

Such copy data distribution processing can distribute data into a plurality of paths, and further the remote copy keeps going as long as all the paths are not blockaded.

As described above, according to the storage system of this embodiment, the local storage device 101 includes the path creation program 221, the path check program 222 and the remote copy program 223 executed by CPU 203 and thereby the following effects can be obtained.

(1) Under a premise that virtual ports in which a plurality of IP addresses can be set in a single physical port of the local storage device 101 and the remote storage device 102 can be created, the CPU 203 of the local storage device 101 executes the path creation program 221 and thereby can create a plurality of paths interposing a plurality of lines 111 between the local storage device and the remote storage device 102. In addition, if a manager has only to register an IP address of a physical port of the remote storage device 102, the CPU 203 of the local storage device 101 can create a plurality of paths between the local storage device 101 and the remote storage device 102.

(2) The CPU 203 of the local storage device 101 executes the pass check program 222 and thereby can check a plurality of path status between the local storage device 101 and the remote storage device 102. In addition, the CPU 203 of the local storage device 101 executes the path check program 222 periodically and thereby checks a plurality of path status to display it on the output device 407 of the management terminal 103 for notifying a manager of the path status.

(3) The CPU 203 of the local storage device 101 executes the remote copy program 223 and thereby can distribute data of logical volumes accessed from the host computer 104 into a plurality of normal paths, to perform a remote copy from the local storage device 101 to the remote storage device 102. In addition, the CPU 203 of the local storage device 101 checks the path status and thereby can distribute the data into the normal paths to perform the remote copy in the remote copy program 223 as long as not all of the paths are closed.

(4) Since the remote copy function that data are distributed into a plurality of lines 111 which are cheap and have a low data rate to perform a copy can be realized, it is possible to speed up the lines virtually, to enable coping with increase of an amount of copy data and low cost of lines to be compatible.

Various modifications and alterations of this invention will be apparent to those skilled in the art without departing from the scope and spirit of this invention, and it should be understood that this is not limited to the illustrative embodiments set forth herein.

What is claimed is:

1. A storage system having a first storage device, a second storage device and a plurality of lines for connecting the first storage device and the second storage device,
wherein the first storage device comprises a logical volume accessed from a host computer; a path management table for recording status of a plurality of paths interposing the plurality of lines between the first storage device and the second storage device; a remote copy program for distributing data of the logical volume into the plurality of paths on the basis of the respective status of the plurality of paths recorded on the path management table, to perform a remote copy from the first storage device to the second storage device; and a CPU for executing the remote copy program,
wherein, in the first storage device and the second storage device, virtual ports in which a plurality of IP addresses can be set in a physical port are created, and wherein IP addresses of routers traversing different lines for the respective virtual ports are registered as default gateways, thereby creating different paths for the respective lines.

2. The storage system according to claim 1, wherein the first storage device further comprises a path creation program which is executed by the CPU to create the plurality of paths between the first storage device and the second storage device.

3. The storage system according to claim 2, wherein the path creation program creates a plurality of path on the basis of an IP address of a physical port of the second storage device registered by a manager upon creating the plurality of paths between the first storage device and the second storage device.

4. The storage system according to claim 1, wherein the first storage device further comprises a path check program which is executed by the CPU to check status of the plurality of paths between the first storage device and the second storage device.

5. The storage system according to claim 4, wherein the path check program periodically checks the plurality of paths and distributes data into normal paths to performs remote copy as long as all the paths are not blockaded.

6. The storage system according to claim 4, further comprising a management terminal including an output device which displays a result of checking status of the plurality of paths, the management terminal being connected to the first storage device.

7. A remote copy control method in a storage system having a first storage device, a second storage device and a plurality of lines for connecting the first storage device and the second storage device, comprising:
a CPU included in the first storage device executing a remote copy program;
distributing data of the logical volume accessed from a host computer into a plurality of paths on the basis of the respective status of the plurality of paths interposing the plurality of lines between the first storage device and the second storage device, the plurality of path being recorded on the path management table; and
performing a remote copy from the first storage device to the second storage device,
wherein, in the first storage device and the second storage device, virtual ports in which a plurality of IP addresses can be set in a physical port are created, and wherein IP addresses of routers traversing different lines for the respective virtual ports are registered as default gateways, thereby creating different paths for the respective lines.

8. The remote copy control method according to claim 7, wherein the CPU included in the first storage device executes a path creation program to create the plurality of paths between the first storage device and the second storage device.

9. The remote copy control method according to claim 8, wherein the path creation program creates a plurality of path on the basis of an IP address of a physical port of the second storage device registered by a manager upon creating the plurality of paths between the first storage device and the second storage device.

10. The remote copy control method according to claim 7, wherein the CPU included in the first storage device executes a path check program to check status of the plurality of paths between the first storage device and the second storage device.

11. The remote copy control method according to claim 10, wherein the path check program periodically checks the plurality of paths and distributes data into normal paths to perform a remote copy as long as all the paths are not blockaded.

12. The remote copy control method according to claim 10, wherein a result of checking status of the plurality of paths is displayed on an output device included in a management terminal connected to the first storage device.

13. A storage system having a local storage device, a remote storage device and a plurality of lines for connecting the local storage device and the remote storage device,
wherein the local storage device comprises a logical volume accessed from a host computer; a path management table for recording status of a plurality of paths interposing the plurality of lines between the local storage device and the remote storage device; a remote copy program for distributing data of the logical volume into the plurality of paths on the basis of the respective status of the plurality of paths recorded on the path management table, to perform a remote copy from the local storage device to the remote storage device; a path creation program for creating the plurality of paths between the local storage device and the remote storage device; a path check program for checking status of the plurality of paths between the local storage device and the remote storage device; and a CPU for executing the remote copy program, the path creation program and the path check program,
wherein the CPU executes the path creation program to create the plurality of paths between the local storage device and the remote storage device; after creating the plurality of paths, the CPU executes the path check program to check status of the plurality of paths between the local storage device and the remote storage device; the CPU performs the remote copy program on the basis of a result of checking the plurality of paths, to distribute data of the logical volume into the plurality of paths on the basis of the respective status of the plurality of paths recorded on the path management table, thereby performing a remote copy from the local storage device to the remote storage device, and
wherein, in the local storage device and the remote storage device, virtual ports in which a plurality of IP addresses can be set in a physical port are created, and wherein IP addresses of routers traversing different lines for the respective virtual ports are registered as default gateways, thereby creating different paths for the respective lines.

* * * * *